United States Patent [19]

Adi

[11] Patent Number: 4,849,898
[45] Date of Patent: Jul. 18, 1989

[54] METHOD AND APPARATUS TO IDENTIFY THE RELATION OF MEANING BETWEEN WORDS IN TEXT EXPRESSIONS

[75] Inventor: Tammam Adi, San Jose, Calif.

[73] Assignee: Management Information Technologies, Inc., Washington, D.C.

[21] Appl. No.: 195,293

[22] Filed: May 18, 1988

[51] Int. Cl.[4] ............................................ G06F 15/40
[52] U.S. Cl. .............................. 364/419; 364/274.8; 364/943; 364/200; 364/900
[58] Field of Search ............... 364/419, 274.8, 943, 364/200, 900

[56] References Cited

U.S. PATENT DOCUMENTS

| | | | |
|---|---|---|---|
| 4,471,459 | 9/1984 | Dickinson | 364/419 |
| 4,627,023 | 12/1986 | Hashimoto | 364/419 |
| 4,674,066 | 6/1987 | Kucera | 364/419 |
| 4,774,596 | 9/1988 | Hashimoto | 364/419 |
| 4,775,956 | 10/1988 | Kaji | 364/419 |
| 4,783,758 | 11/1988 | Kucera | 364/419 |

OTHER PUBLICATIONS

Dr. T. Adi and Mr. O. K. Ewell, "Artificial Intelligence versus Machine Comprehension," pp. 4, 8, May 18, 1987, Washington, D.C.
Mr. Ken Ewell and Dr. Tom Adi, "Natural Language is as Natural as Natural Phenomena," Oct. 30, 1987, Atlantic City, New Jersey.
Dr. T. Adi and Mr. O. K. Ewell, "Letter Semantics in Arabic Morphology: A Discovery About Human Languages," pp. 21-52, Jul. 1987, Stanford University.

*Primary Examiner*—Joseph Ruggiero
*Assistant Examiner*—Gail O. Hayes
*Attorney, Agent, or Firm*—Finnegan, Henderson, Farabow, Garrett & Dunner

[57] ABSTRACT

A text comprehension and retrieval method and apparatus that uses letter-semantic analysis of the micro-syntax, or the syntax between the letters, in two words to measure how much two words are related as to their meanings or the human language concepts they present. Letter-semantic analysis involves assigning numerical values to the letters of a first word and a second word based on the dual characteristics of orientation and category inherent in the letters, and then analyzing those numerical values to identify the semantic relatedness of the letters of the first word to the letters of the second word. A letter semantic-matrix assigns weights to the meaningful letters to allow the application of letter semantic rules to convert the concepts represented by the letters of the words to numeric values. The numeric values represent the amount of relatedness of the first word to the second word and are used to retrieve text from documents having concepts related to a user supplied query expression.

21 Claims, 7 Drawing Sheets

FIG.3

Letter Semantic Matrix 200

| CATEGORY | | W T | ORIENTATION | | | |
|---|---|---|---|---|---|---|
| FACULTY | ACTIVITY | | Subject/ Homeward +1 -2 | Objective/ Outward -1 +2 | Common Positive DUAL +1 +2 | Non-Common/ Negative DUAL -1 +2 |
| 1. Entity | Exist | 1 | AA | J | V, W | H |
| 2. Medium | Happen | 1 | M | F, PH, P$^2$ | D | DH, TH |
| 3. Quantum | Control | 1 | QH | N, GN | Q, CQ | NG, NK, NC |
| 4. Set | Assign | 2 | R | L | B | T |
| 5. Structure | Quantize | 2 | S | Z | C | HC |
| 6. Field | Mapping | 2 | K, CK | DK | TK | X, KH, GH, CH |
| 7. Thing | Process | 3 | HH | SH | G | ZH |

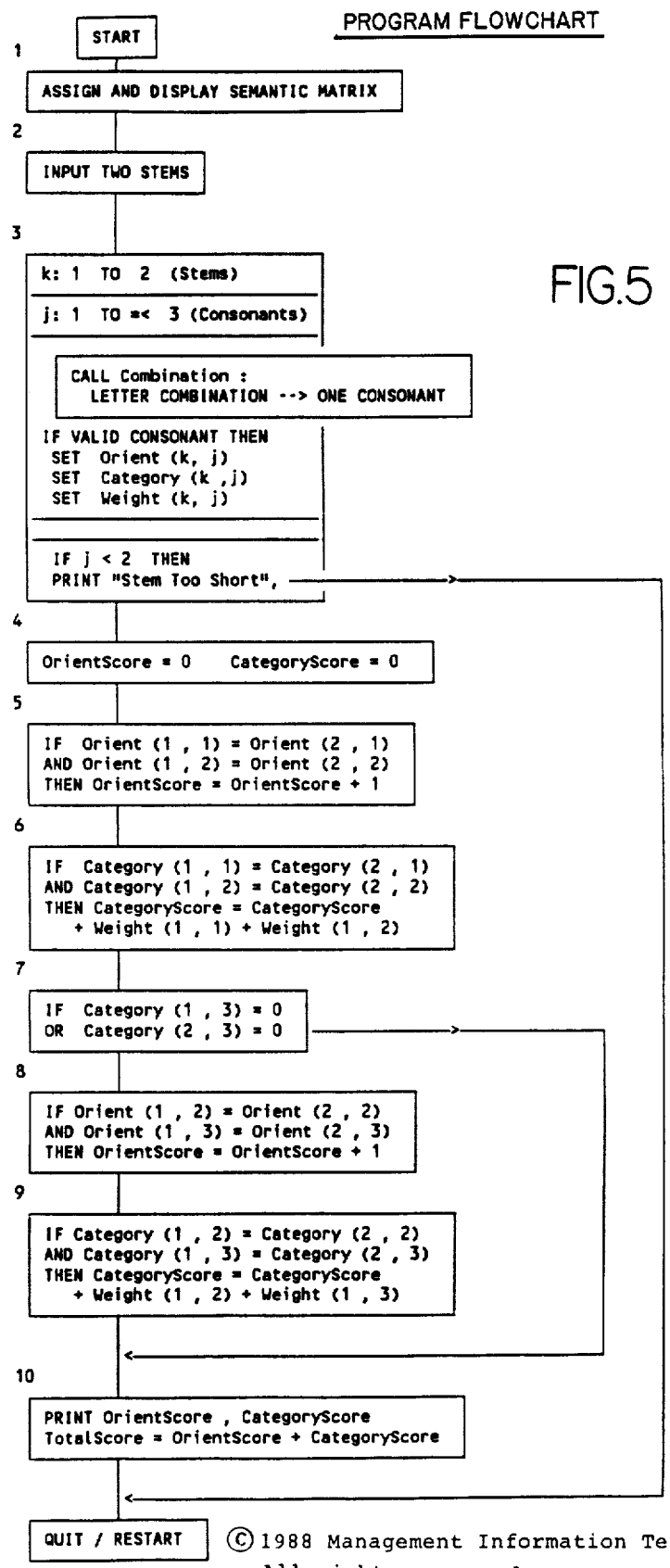

© 1988 Management Information Technologies, Inc.
   All rights reserved.

```
DEFINT A-Z: OPTION BASE 1
1 Restart:
  CLEAR
  REDIM Stem$(2)         ' Two Stems, A Maximum Of Three Consonants Each
  REDIM Orient(2, 3)     ' Orientations Per Stem
  REDIM Category(2, 3)   ' Categories Per Stem
  REDIM Weight(2, 3)     ' Category Weights Per Stem Consonants$   = "-αJVWHMFPD&ΩNQΓRLBTSZCΘKδτXε$GX"   ' LETTER
  Orientations$ = "-12334122341234123412341234"       ' SEMANTIC
  Categories$   = "-11111222233334444555566667777"    ' MATRIX
  Weights$      = "-111111121111112222222222223333"

COLOR 14, 1: CLS : RESTORE
  FOR i = 1 TO 20: READ L$: PRINT L$: NEXT i     ' PRINT MATRIX
2 INPUT ; " First Stem (Vowels Are Ignored):", Stem$(1)   ' Input Two Stems
  INPUT "    Second Stem: ", Stem$(2): PRINT
  Stem$(1) = UCASE$(Stem$(1)): Stem$(2) = UCASE$(Stem$(2))  ' Make Upper Case 3 FOR k = 1 TO 2                ' Scan Two Stems
    j = 0                       ' Valid Consonant Count
    FOR i = 1 TO LEN(Stem$(k))
      i$ = MID$(Stem$(k), i, 1): Two$ = MID$(Stem$(k), i, 2)
      GOSUB Combination         ' Reduce Two Letters To One
      IF done THEN i = i + 1    ' Skip One Letter If Combination Or Double
      e = INSTR(Consonants$, i$)
      IF e > 1 THEN             ' Take Only Valid Consonants
        IF j < 3 THEN           ' A Maximum of Three Consonants Per Stem
          j = j + 1'  New Consonant
          Orient(k, j)   = VAL(MID$(Orientations$, e, 1))   ' ASSIGN
          Category(k, j) = VAL(MID$(Categories$, e, 1))'  ARRAY
          Weight(k, j)   = VAL(MID$(Weights$, e, 1))'  VALUES
          IF j = 3 THEN EXIT FOR    ' Three Consonants Taken Already
        END IF
      END IF
    NEXT i
    IF j < 2 THEN PRINT "STEM TOO SHORT": GOTO TooShort
  NEXT k 4 OrientScore = 0: CategoryScore = 0

5 IF Orient(1, 1) = Orient(2, 1) AND Orient(1, 2) = Orient(2, 2) THEN
    OrientScore = OrientScore + 1
  END IF 6 IF Category(1, 1) = Category(2, 1) AND Category(1, 2) = Category(2, 2) THEN
    CategoryScore = CategoryScore + Weight(1, 1) + Weight(1, 2)
  END IF 7 IF Category(1, 3) = 0 OR Category(2, 3) = 0 GOTO PrintResult ' 2 Consonants 8 IF Orient(1, 2) = Orient(2, 2) AND Orient(1, 3) = Orient(2, 3) THEN
    OrientScore = OrientScore + 1
  END IF 9 IF Category(1, 2) = Category(2, 2) AND Category(1, 3) = Category(2, 3) THEN
    CategoryScore = CategoryScore + Weight(1, 2) + Weight(1, 3)
  END IF
```

FIG.6A

© 1988 Management Information Technologies, Inc.
    All rights reserved.

```
10 PrintResult:
   PRINT " Orientationl_Association:"; OrientScore;
   PRINT " Category_Association:"; CategoryScore;
   PRINT " Total_Score:"; OrientScore + CategoryScore;

TooShort: LOCATE 25, 1: PRINT " HIT ANY KEY TO RESTART, Esc = Quit";
   g$ = INPUT$(1): IF g$ <> CHR$(27) GOTO Restart
   CLS : END

' SUBROUTINE

Combination:     ' Check Letter Combinations
   done = 1      ' Assume Valid Combination
   IF Two$ = "PH" THEN i$ = "F": RETURN
   IF Two$ = "GN" THEN i$ = "N": RETURN
   IF Two$ = "CK" THEN i$ = "K": RETURN
   IF Two$ = "CQ" THEN i$ = "Q": RETURN
   IF Two$ = "AA" THEN i$ = "α": RETURN
   IF Two$ = "QH" THEN i$ = "Ω": RETURN
   IF Two$ = "HC" THEN i$ = "θ": RETURN
   IF Two$ = "TK" THEN i$ = "τ": RETURN
   IF Two$ = "DK" THEN i$ = "δ": RETURN
   IF Two$ = "HH" THEN i$ = "ε": RETURN
   IF Two$ = "ZH" THEN i$ = "%": RETURN
   IF Two$ = "SH" THEN i$ = "$": RETURN
   IF Two$ = "DH" OR Two$ = "TH" THEN i$ = "&": RETURN
   IF Two$ = "NG" OR Two$ = "NK" OR Two$ = "NC" THEN i$ = "I": RETURN
   IF Two$ = "CH" OR Two$ = "GH" OR Two$ = "KH" THEN i$ = "X": RETURN
   IF LEN(Two$) = 2 AND LEFT$(Two$, 1) = RIGHT$(Two$, 1) THEN RETURN 'Doubles
   done = 0: RETURN 'No Combination Return
```

SEMANTIC MATRIX

| CATEGORY | | WT | ORIENTATION | | | |
|---|---|---|---|---|---|---|
| Faculty | Activity | | homeward + - | outward - + | common + + | non-common - - |
| Entity | Exist | 1 | AA | J | V, W | H |
| Medium | Happen | 1 | M | F, PH   P | D | DH, TH |
| Quantum | Control | 1 | QH | N, GN | Q, CQ | NG, NK, NC |
| Set | Assign | 2 | R | L | B | T |
| Structure | Quantize | 2 | S | Z | C | HC |
| Field | Mapping | 2 | K, CK | DK | TK | X, KH, GH, CH |
| Thing | Process | 3 | HH | SH | G | ZH |

FIG. 6B

METHOD AND APPARATUS TO IDENTIFY THE RELATION OF MEANING BETWEEN WORDS IN TEXT EXPRESSIONS

BACKGROUND OF THE INVENTION

I. Field of the Invention

This invention relates to a method and apparatus for computerized associative comprehension between two natural language expressions.

II. Description of the Related Art

Computerized text retrieval systems aid a user in searching large numbers of computer coded documents to find one or more documents containing key words or specific combinations of keywords. Text retrieval systems, also called information data bases, contain one or more libraries of full text documents or specially coded summaries of documents. These summaries are usually limited to titles, abstracts, keywords and an index to the location of the hardcopy full text information. The text or summaries of the documents are usually stored on a magnetic disk in ASCII (American Standard Code for Information Interchange) form.

Typically, if a computer library contains full text documents, the documents have been "indexed" to provide special index word search files to speed the search. An example of an indexed full text retrieval system that runs on MS DOS based microcomputers is ZyINDEX by ZyLAB Corporation of Chicago, IL. A large commercial data base, DIALOG, run by Dialog Information Services of Palo Alto, CA, comprises data bases that provide both truncated documents consisting of title, abstract, keywords, and location information, and full text documents.

Advanced text retrieval systems use Boolean logic and literal character matching to match the characters of words in a user supplied query expression to words in a text document. A typical query expression may be "(TEXT W/3 RETRIEV!) OR (DATA W/5 BASE)." Taking this query, the computer searches each keyword index or each document in the database for a literal match to the word "TEXT" or "TEXTS" (the "S" is presumed by the search program) within three words ("W/3") of "RETRIEVE," "RETRIEVAL," "RETRIEVES," etc., where the "!" instructs the computer to accept all words starting with "RETRIEV." The computer also attempts to match "DATA" within five words of "BASE" or "BASES" because of the logical "OR" command.

The search consists of literal letter matching, i.e., if the word "TEXT" is found in the document along with "RETRIEVERS," a match is indicated. This may or may not be a relevant document; the phrase in the document could be "text on golden retrievers," whereas the user was searching for documents containing the phrase "text retrieval." Similarly, if a pertinent document discusses document retrieval, no match is found because the user specified "TEXT" in the query.

Some document retrieval systems use weighted word searches, where the number of occurrences of a word in a document determine the order of relevance. Documents with the most occurrences of the keyword are assumed to be the most relevant and are brought to the user's attention.

Literal text retrieval by character and word matching is essential where an exact word or known expression must be found, but has major drawbacks. The user constructing the query must be familiar with the author's word usage and document structure, otherwise relevant documents will be omitted. The user must be proficient in the use of the query language in order to construct a successful search; a successful search being one that retrieves only the most pertinent documents while ignoring extraneous documents that use similar words in different contexts.

Weighted word searches again require knowledge of the author's word usage and document structure, otherwise irrelevant documents are retrieved and important documents are missed. If a user wishes to find documents containing certain concepts or information, regardless of the specific terminology used in the document, a character or word matching search is difficult and prone to failure (i.e., missing relevant documents and/or gathering irrelevant documents) unless the user can guess the exact words used in each searched document to discuss the relevant concept Different authors frequently use different words to convey the same meaning.

It is therefore an object of the present invention to provide a computerized text associative comprehension system that will identify the documents or portions of documents representing related concepts to a user selected query expression regardless of whether the searched text literally matches the query expression words.

It is also an object of the present invention to provide a text and document retrieval system that uses plain language query expressions.

It is also an object of the present invention to provide a text and document retrieval system that is relatively language independent, that is, the query expression words may be written in one language and the text to be associated may be in a number of different languages.

It is also an object of the present invention to provide a text and document retrieval system that has an unlimited vocabulary in several languages.

Additional objects and advantages of the invention will be set forth in the description which follows, and in part will be obvious from the description, or may be learned by practice of the invention. The objects and advantages of the invention may be realized and obtained by means of the instrumentalities, methods and combinations particularly pointed out in the appended claims.

SUMMARY OF THE INVENTION

To achieve the foregoing objects, and in accordance with the purposes of the invention as embodied and broadly described herein, a text comprehension and retrieval system is provided for identifying text words presenting concepts in a computer coded document related to the concepts presented in a computer coded expression of query words, comprising: calculating a first letter-semantic value for each of the query words by comparing each of the query words to itself; calculating a plurality of second letter-semantic values for each of the text words in a plurality of blocks of text of dynamically predetermined size by comparing each of the query words to each of the text words in each of said blocks; identifying the text words of the one of said blocks having second letter-semantic values that compare most closely to said first letter-semantic values.

The accompanying drawings, which are incorporated in and constitute a part of the specification, illustrate a preferred embodiment of the invention and, together with the general description given above and the detailed description of the preferred embodiment given below, serve to explain the principles of the invention.

BRIEF DESCRIPTION OF THE DRAWINGS

FIG. 3 is a semantic matrix used in the text retrieval system of FIG. 1;

FIG. 5 is a flowchart of a computer program that generates word stems and calculates letter-semantic values using the semantic matrix of FIG. 3; and FIG. 6A is page 1 of the source code of the computer program represented by the flowchart of FIG. 5.

FIG. 6B is page 2 of the source code of the computer program by the flowchart of FIG. 5.

DESCRIPTION OF THE PREFERRED EMBODIMENT

Reference will now be made in detail to the present preferred embodiment of the invention as illustrated in the accompanying drawings.

Figure 1:
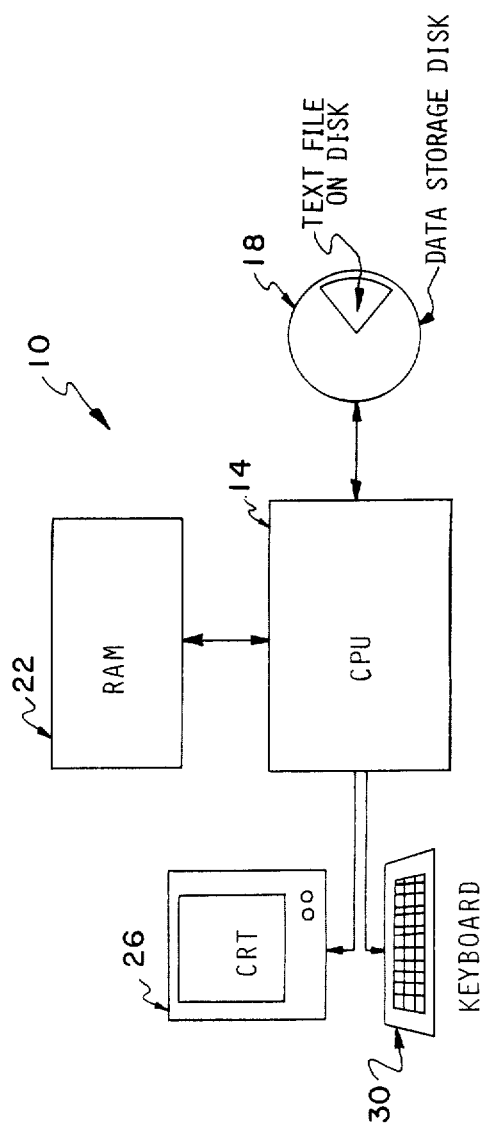
FIG. 1 is a block diagram of a computer system that operates a text retrieval system incorporating the teachings of the present invention.
Figure 2:
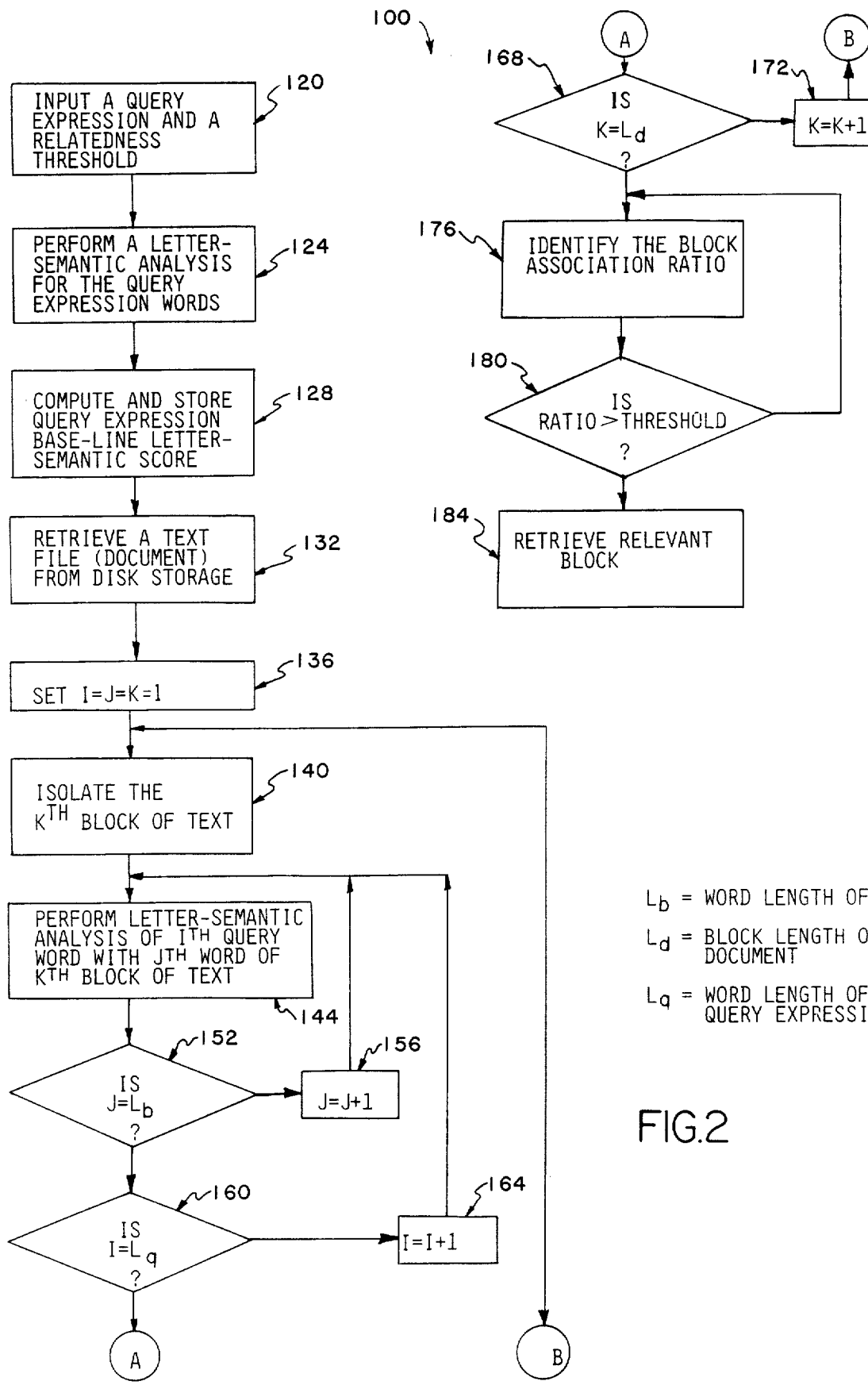
FIG. 2 is a flowchart of a text retrieval system that operates on the computer system of FIG. 1.

The preferred embodiment of the text retrieval system of the invention is shown by computer system 10 of FIG. 1 which stores the programs, documents and data of the text retrieval system, and executes the steps of flowchart 100 of FIG. 2. Computer system 10 comprises CPU 14, data storage disk 18, random access memory 22, display device 26, and keyboard 30.

In general, a user enters a query expression and a query "relatedness threshold" numeric value to CPU 14 via keyboard 30. CPU 14 conducts a letter-semantic analysis (discussed in greater detail below) of each word of the query expression and stores the result in RAM 22 as a base-line letter-semantic relatedness value. CPU 14 then retrieves a block of words from a text file on data disk 18 and performs a letter-semantic analysis of each word of the query expression as compared to each word in the block of words, and stores the result in RAM 22. CPU 14 continues to retrieve and perform letter-semantic analyses of blocks of words and to store the results of the analyses until all blocks in the text file are complete. CPU 14 then compares the result of the letter-semantic analysis of each block of words to the query expression base-line letter-semantic relatedness value to determine the level of letter-semantic relatedness of the words of each block to the words of the query expression. CPU 14 then retrieves or marks for retrieval those blocks having a letter-semantic relatedness value that equals or exceeds the relatedness threshold set by the user.

The letter-semantic relatedness value is a measure of how closely the concepts or meaning presented by the words of the text document relate to the concepts or meanings presented by the user's query expression.

Turning now to a detailed analysis of flowchart 100 of FIG. 2, the user inputs the words of a query expression in step 120. The language of the query expression, comprising a first query word, second query word, etc., presents a concept, or has meaning in the accepted sense of language. Computer 10, as will be discussed in more detail below, will search the words of the text file, using letter-semantic analysis, to find groups of words having similar meaning, regardless of whether the text file words literally match the query expression words.

The query expression input by the user in step 120 could, for example, comprise the four words "do a crops study." Computer system 10, in step 124, conducts a letter-semantic analysis of each query word in order to establish a base line letter-semantic relatedness value of how each query word relates to itself.

Letter-semantic analysis looks to micro-syntax, or the syntax between the letters in two words and relates the two words by their semantic structure and weight, that is, it measures how much two words are related as to their meanings or the human language concepts they present. Letter-semantic analysis comprises assigning numeric values to the letters of a first word and a second word based on the orientation and category meanings of each letter, as represented by the location of the letters in a semantic matrix, and then analyzing those numerical values to identify the semantic relatedness of the letters of the first word to the letters of the second word. To assign the base line letter-semantic relatedness values to the words of the query expression, each query word is compared to itself, therefore the first word and the second word in the letter-semantic analysis are the same query word.

In accordance with the invention, numeric values are assigned to the letters of each word according to a an orientation meaning and a category meaning of each letter as shown in a semantic matrix. As shown by way of example and not as a limitation, a preferred semantic matrix 200 of FIG. 3 relates the consonants of analyzed words to matrix categories, also called semantic themes, and to orientations, from each of which numeric weights are derived. The names assigned to the orientations (columns) and categories (rows) shown in matrix 200 are merely descriptive and will be discussed in greater detail below. The process of applying the values and weights of semantic matrix 200 to the letters of the first and second words and measuring their letter-semantic relatedness is shown in flowchart 250 of FIG. 4. This process is also performed by a computer program subroutine, or subprogram, shown in flowchart form in FIG. 5 and as BASIC source code, designed to run under Microsoft Quick BASIC version 4.0, in FIGS. 6A and 6B.

Vowels are removed from both the first and second words, step 254. Using morphological analysis to detect bi- or tri-literal stems, the words are reduced to their two or three most meaningful consonants. Words that reduce to a single letter, such as "DO," are ignored, step 258. The digraphs "TH," "GN," "NG," "NC," "NK," "CK," "CH," "GH," "CQ," "PH," and "SH" are treated as a single consonants for letter-semantic analysis, and with this in mind, both words are reduced to no more than three consonants, step 262. The words of the query expression are now reduced to "CRP" and "STD." "DO" and "A" are discarded. In reducing a word to its stem, most variations of a word are thereby automatically included in the analysis.

Taking the first query word, reduced to "CRP," as both the first and second words of the letter-semantic analysis, orientation numbers and weights are assigned, step 266. "C" is in column 3 of letter-semantic matrix 200, therefore "C" is assigned an orientation number of 3. "R" is located in column 1 of matrix 200 and is assigned an orientation number of 1. "P" is located in column 2 of matrix 200 and is assigned an orientation number of 2. An orientation weight of ½ is assigned to each letter.

Category numbers and category weights are now assigned to the letters of the first and second words, step 270. "C" is located in row 5 of matrix 200 and is assigned a category number of 5. "R" is located in row 4 of matrix 200 and is assigned a category number of 4. "P" is located in row 2 of matrix 200 and is assigned a category number of 2. Category weights are chosen from the numbers in the column of matrix 200 marked "WT" corresponding to the row containing each letter. "C," "R," and "P" are assigned category weights of 2, 2, and 2, respectively. "P" is the exception to assigning category weights and receives a weight of 2 even though the weight associated with row 2 is 1. The letters of the first and second words along with their numbers and weights can be depicted as follows:

| First Word | C | R | P | Second Word | C | R | P |
|---|---|---|---|---|---|---|---|
| Orientation Number | 3 | 1 | 2 | | 3 | 1 | 2 |
| Orientation Weight | 0.5 | 0.5 | 0.5 | | 0.5 | 0.5 | 0.5 |
| Category Number | 5 | 4 | 2 | | 5 | 4 | 2 |
| Category Weight | 2 | 2 | 2 | | 2 | 2 | 2 |

The orientation numbers of each pair of consonants in each word are compared and the appropriate weights are added to an orientation association number, step 274, if the orientation numbers match. The orientation numbers (3 1) of the first pair of consonants "CR" of the first word are compared to the orientation numbers (3 1) of the first two consonants "CR" of the second word. The orientation numbers match, as they must because the first and second words are identical, therefore the orientation weights of the first two consonants of the first word are added to the orientation association number, 0.5+0.5=1.0. The orientational association number is initially zero. The orientation numbers (1 2) of the next pair of consonants "RP" of the first word are compared to the orientation numbers (1 2) of the second pair of consonants "RP" of the second word. The orientation numbers must also match, therefore the orientation weights of the second pair of consonants of the first word are added to the orientation association number, 1.0+0.5+0.5=2.0.

The category numbers of each pair of consonants in each word are compared and the appropriate weights are added to a category association number, step 278, as follows. The category numbers (5 4) of the first pair of consonants "CR" of the first word are compared to the category numbers (5 4) of the first two consonants "CR" of the second word. The category numbers match, as they must because the first and second words are identical, therefore the category weights of the first two consonants of the first word are added to the category association number, 2+2=4. The category numbers (4 2) of the next pair of consonants "RP" of the first word are compared to the category numbers (4 2) of the second two consonants "RP" of the second word. The category numbers must also match, therefore the category weights of the second pair of consonants of the first word are added to the category association number, 4+2+2=8.

The total association of the first query word to itself is the sum of the category association and the orientation association, which is 2.0+8=10. This gives the base line letter-semantic association value for the first query word. To this is added the total association number of the second query word ("STD") calculated in the same manner. This gives the base line letter-semantic association value for the entire query expression, which consists of two words (once the vowels and single consonant words are removed). Computer 10 of FIG. 1 stores this base line value in RAM 22 for later use.

Returning to step 132 of the flowchart of FIG. 2, computer 10 retrieves a text file from data storage disk 18 and begins to conduct a letter-semantic analysis of the words of the text file. The text file requires no pre-processing to prepare it for this analysis, that is, no keyword indexes or other preparation need be made. In the preferred embodiment, the words are made up of standard upper and lower case ASCII characters with no control codes, although other coding schemes could just as easily be used.

In accordance with the invention, each text word in the text file is read and meaningful words, i.e. words whose stems contain more than one consonant, are compared using letter-semantic analysis to each meaningful word of the query expression. Comparisons are done in a block of text file meaningful words whose size (in numbers of words) can be adapted to the size of the query expression. For letter-semantic analysis to measure the relatedness of the concepts presented by the words of the text file to the concepts presented by the words of the query expression, each meaningful query word must be letter-semantically analyzed with each meaningful text file word in each block of text. Thus, the relatedness of groups of words is analyzed, as opposed to literal text matching which attempts a one-to-one match of each query word with each text file word.

A typical block size in the preferred embodiment is 10 words, although the size is not critical and may vary with the application. In the preferred embodiment the block size is dynamically predetermined based on the number of meaningful query words, N. The block size, in meaningful words, is preferably N×5, although multipliers other than 5 are useful. Computer 10 selects a block of words consisting of the first 10 meaningful words of the text file for letter-semantic analysis, step 140 of FIG. 2. The first query word and the first word in the block are analyzed for letter-semantic relatedness, as will be discussed in more detail below, then the first query word and the second word in the first block are analyzed, then the first query word and the third word in the block, etc. until all words in the block are analyzed with respect to the first query word. The process is then repeated for each word in the block as analyzed with the second query word, and then for a third query word, etc., although the example only shows a query of two words.

The total association number for each analysis of each query word to each text file word in the block is stored as a cumulative numeric block store in RAM 22. The block score is a measure of the letter-semantic relatedness of the concepts presented by the words of the block as compared to the concepts presented by, the words of the query expression. This process is shown in flowchart 100 by steps 140 to 164.

Computer 10 then selects a second block of 10 text file words, steps 168 and 172, but the second block is chosen to overlap the words of the first block by about 50%. This allows a varying choice of blocks, not solely determined by sequences of words.

After each text file word in each of the blocks has been analyzed against each query word, and each block score has been stored, computer 10 generates a block relatedness value ratio, step 176. The block relatedness value ratio is the ratio of each block score to the baseline letter-semantic association value for the query expression. Blocks with a relatedness value ratio equal to at least the user selected relatedness threshold are selected for-retrieval and display, steps 180 and 184, as these are the portions of the text file containing expressions of concepts most related to the concepts presented by the query expression.

This letter-semantic analysis technique may also be applied to several files in one search session, and only the most related blocks of the most related files may be selected for display.

Returning now to step 144, the letter semantic analysis of a query word with a text file word will be discussed in detail. Except for the use of different first and second words for the analysis, the overall process is identical to step 124, but the numbers and weights will now vary because the first and second words are not identical. Assume for the sake of example that the second query word, "STUDY" is to be used as the first word for the letter semantic analysis, and an arbitrary word "CHARM" is to be used as the second word. The first word is always the query word and the second word is always the text file word, by convention, but the process could be reversed.

Figure 4:
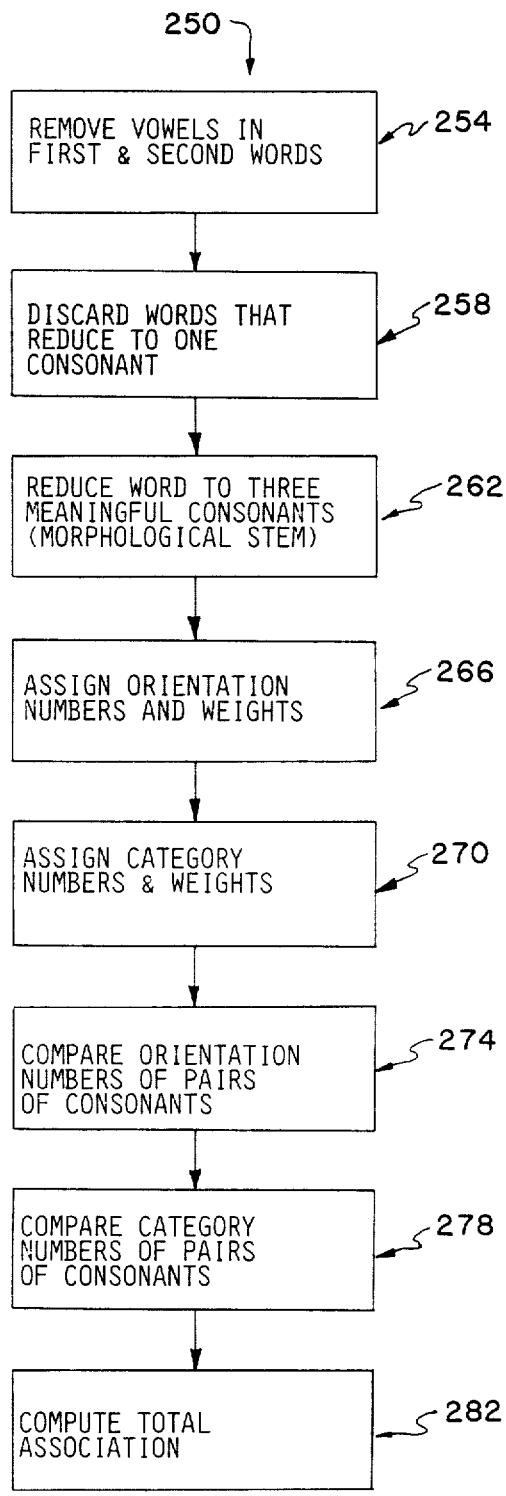
FIG. 4 is a flowchart of the process of applying letter semantics and the semantic matrix of FIG. 3 to calculate letter-semantic values to determine the relatedness of words.

The letter semantic analysis of step 144 is shown in greater detail by flowchart 200 of FIG. 4. Vowels are removed from the first and second words, step 254, leaving "STD" and "CHRM." Neither word reduces to one consonant, therefore step 258 may be ignored. The word stems are now reduced to three meaningful consonants, step 262, but the digraphs "TH," "GN," "NG," "NC," "NK," "CK," "CH," "GH," "CQ," "PH," and "SH" are treated as a single consonant for letter-semantic analysis. "CHRM" retains all four consonants, with "CH" being treated as one consonant. To avoid confusion, "CH" will be replaced with an equivalent consonant "X" from semantic matrix 200. "CHRM" is therefore represented by "XRM."

Taking the first query word, reduced to "STD," orientation numbers and weights and category numbers and weights are assigned, steps 266 and 270, according to the locations of the consonants in matrix 200. "S" is in column 1 and row 5 of matrix 200, therefore the orientation number is 1, the category number is 5, the category weight is 2 and the orientation weight is 0.5. The orientation weight is always 0.5, regardless of the matrix position of the consonant. The remaining consonants of the first and second words are assigned numbers and weights in a similar manner and can be represented as follows:

| First Word | S | T | D | Second Word | X | R | M |
|---|---|---|---|---|---|---|---|
| Orientation Number | 1 | 4 | 3 | | 4 | 1 | 1 |
| Orientation Weight | 0.5 | 0.5 | 0.5 | | 0.5 | 0.5 | 0.5 |
| Category Number | 5 | 4 | 2 | | 6 | 4 | 2 |
| Category Weight | 2 | 2 | 1 | | 2 | 2 | 1 |

The orientation numbers of each pair of consonants in each word are compared and the appropriate weights are added to an orientation association number, step 274, which is initially set to zero. The orientation numbers (1 4) of the first pair of consonants "ST" of the first word are compared to the orientation numbers (4 1) of the first pair of consonants "XR" of the second word. The orientation numbers do not match, therefore the orientation weights of the first two consonants of the first word are not added to the orientation association number, which remains zero. The orientation numbers (4 3) of the next pair of consonants "TD" of the first word are compared to the orientation numbers (1 1) of the second pair of consonants "RM" of the second word. The orientation numbers again do not match, therefore the orientation association number remains zero.

The category numbers of each pair of consonants in each word are compared and the appropriate weights are added to a category association number, step 278, which is initially set to zero. The category numbers (5 4) of the first pair of consonants "ST" of the first word are compared to the category numbers (6 4) of the first pair of consonants "XR" of the second word. The category numbers do not match, therefore the category association number remains zero. The category numbers (4 2) of the next pair of consonants "TD" of the first word are compared to the category numbers (4 2) of the second pair of consonants "RM" of the second word. The category numbers match, therefore the category weights of the second pair of consonants of the first word are added to the category association number, $0+2+1=3$.

The total association of the first query word to the example text word is the sum of the category association and the orientation association numbers, which is $0+3$. This gives a total letter-semantic association value for the words "STUDY" and "CHARM" of 3. This value is added to the total letter-semantic association values of the query words as compared to the other text words of the block to give the block score. Computer 10 of FIG. 1 stores this block score in RAM 22 for later use.

Semantic measurement automatically scores each block of text that meaningfully associates to the input expression, regardless of whether or not a word from the inquiry literally appears in the text. Similar concepts have equal weights, whether found in reports, excerpts, notes, or even different languages. They are automatically and dynamically associated by means of semantic matrix 200 which provides a vehicle for meaningful comparisons of letter combinations of one word stem to other stems that may describe the same physical theme or share the same orientation in matrix 200. Suffixes are normally discarded because they add more than three consonants to the reduced stem, therefore all variants of a word, as well as related concepts that describe the category of physical things or share the same orientation in matrix 200 are semantically scored.

Matrix 200, which is presented as an example and not as a limitation to the specific embodiment disclosed, links the combinations of letters of alphabets to real world concepts and provides a structure to convert those concepts to numerical values. Thus the meanings of words and the semantic relations between any two words can be consistently computed by applying the orientation and category characteristics of each letter of each word according to its location within matrix 200. Matrix 200 structures letters according to the principle that letters have two meanings, i.e., an orientation meaning and a category meaning, the latter also being called a semantic theme. Letters having similar orientation meanings and category meanings share the same locations in matrix 200, which represents the heart of letter-semantic analysis.

The location of letters or digraphs, henceforth called primitives, in columns relates those primitives in terms of oriented meanings of categories that expand in time flow in response to perceived realities. The presence of a letter in a column signifies the internal orientation of things and events. Everything has two sides (at least), side one and side two, each bearing a certain sign or orientation such as left and right, or positive and negative.

The location of primitives in rows corresponds to a semantic theme, i.e., a class of things and events in the real world. The first row corresponds to the most elementary fact of existence, the act of being, and is thus an expression of the orientation in the columns of matrix 200. Each row is assigned a faculty name and an activity name representing the static/dynamic duality of a semantic theme. In principle, an activity results into the corresponding faculty (e.g., happening results into a medium) and a faculty is needed to perform an activity (sets are needed for making assignments).

Every orientation has one general meaning that translates into two static aspects and two dynamic aspects. Any mixture of the aspects of an orientation can be valid at any time. Activities are associated with the dynamic aspects of orientations. Faculties are associated with the static aspects of orientation.

Everything is dual (has two sides) and an orientation puts one of two signs (for example + or −) on each side of the literal representation. All combinations are represented (+ −, − +, + +, − −). Orientation 1 (+ −) is symmetrical to orientation 2 (− +) and orientation 3 (+ +) is symmetrical to orientation 4 (− −), and the two symmetry pairs are complimentary to each other (a super-symmetry).

All letters have individual (primitive) meaning, and although it is not possible to explain exactly what each letter means, the location of a letter in matrix 200 identifies it as belonging to a semantic theme (row location) and having a dual orientation (column location). Thus it is possible to define the meaning of any word in terms of the rows and columns of its letters as located in matrix 200.

Letter-semantic analysis therefore depends on the structure of the word as related to matrix 200. The labels identifying the orientations and categories are merely descriptive and can be varied without altering the application of matrix 200.

The structure of a word is given by the column coordinates of its letters in matrix 200. Relators (letters that link parts of a word to one another) also work mainly through their column coordinates (types of dual orientation).

Because every letter also delivers a semantic theme (its row coordinate), the structure of a word can be compared to logical relations between propositions in a logical argument.

The spectrum of a word is defined by the semantic themes that correspond to its letters, whereby only context and situation may set limits to the richness of possible interpretations of the things and events that naturally correspond to that spectrum. This spectrum then, is responsible for the seeming disparity of language in terms of morphology, metaphoric usage, and ambiguity, and is partly responsible for homonyms, synonyms, and other grammatical occurrences of seeming inconsistency.

Structures and spectra contain relations between two or more elements (corresponding to one or more letters). The following discussion examines two-element relations which are called elementary semantic interfaces.

There are three types of elementary semantic interfaces:

(1) Orientations, which define the internal interface inside a single letter, i.e., the orientation of its column in matrix 200;

(2) Angles, which result from the coupling of two adjacent orientations in a word; and (3) Bonds, reflecting the pairing of semantic themes of two letters in a word.

Orientation should not be confused with the row of assignments as a semantic theme. There is a relation "inside" every letter, expressing its dual orientation. The letters of the assignments row have in addition to this, a meaning restricted to relations in the real world. They also work as relators in words. In most cases "R" or "L" are relators.

Assignment letters also denote sets consisting of entities bound (related) to each other according to their respective internal type of orientation, such as "b" in "ball," "baby," "bay" and "bubble" denoting a compact set (parts under positive convergence) and "r" in "row" denoting parts following a subjective orientation, for example the use of the "r" in the multiple meanings of the word "race."

Physically, everything is constantly moving, i.e., dynamic; "sta-," the stem for "static" has several letter-semantic meanings, all having to do with a subjective stream "s" and a dual-negative relation "t." Things are called static if they are too slow for motion to be consciously perceived or for their motion to be detected, or if they repeat a motion at a certain speed.

Consonants contain the most information in a word. The vowel or vocal following a consonant can mean a focus on certain types or aspects of orientations expressed by that consonant.

The structure of letters through their types of orientations and their dynamic/static aspects for each column of matrix 200 will be examined below.

Common Orientations: (+1+2)

The dual-positive type orientations occupy orientation column 3 of matrix 200. There are four types of Common Orientations in many words of the languages examined. The term "positive" is used to distinguish from those of the dual-negative orientation occupying orientation column 4 of matrix 200.

The following types of common orientations are represented by column 3:

(a) POSITIVE CONVERGENCE: Expresses being together, happening in the same time and/or approaching each other simultaneously. The Arabic "wa" (=and) is a good example. "Tkawaa" (=fold) and "laqiya" (=meet) also clarify this sense. The English letter "c" in "con-" exemplifies this type. The use of the letter "v" in "view" and "obvious" and the "d" in "due" are also good examples.

(b) POSITIVE DIVERGENCE: Expresses togetherness as a threshold of going apart in the next moment. This is found in words meaning static or dynamic separation: "Aw" (=or) and "qi" =(protect!). The English "w" in "wall" and the "d" in "die" also express this sense. Other examples exhibiting this orientation are the use of the "b" in "obliterate," and the "c" in "cut," as well as the "q" in "quit."

(c) POSITIVE DUALITY: Is expressed in Arabic by "bi" (=by, because, (tit) for (tat)), "baab" (=door), "d" in "dayn" (=debt). Note the use of the "w" in the word "two" such as a pair, as well as the "c" in "couple." This is also the union of (a) and (b), i.e., a positive exchange or a positive relation in general as in the "d" in "duet," "dual," and "double." Multitude is a generalization of duality. The Arabic suffix "w" expresses this for both nouns and verbs. The English letter "w" in "we" is a good example. Another example is the use of the letter "g" in the phrase "a gross exaggeration."

(d) POSITIVE FACULTY: Means the fact of belonging to the corresponding semantic theme either by conduct (dynamically) or by nature (statically), such as the vocal "-u" that expresses both the nominative case and the present tense in Arabic. The "TK" in "TKayyib" (=good), and "q" in "quwwah" (=force), "qadr" (=power, estiny, and quantity) and "HHaqq" (=lawfulness, truth). An example is the use of the English letter "d" in "do," "day," and "dye." Each of these examples expresses the faculty of taking place, i.e., happening in a certain range of space and time or just occupying space by being material. The "q" in "quantity" and "quantum" and the "g" in "get" both exhibit positive faculty.

Non-Common Orientations: (−1 −2)

These orientations are expressed by column 4 of matrix 200, which contains letters with non-common orientation (dual negative). Negativity means being unusual, special, unwanted, unwilling, inactive, passive, absent, diminishing, vanishing, or just negative.

(a) NEGATIVE CONVERGENCE: In order to make a "tie" (letter t), things are pulled apart while forcing them to stay together. In Arabic, "ta" is used to swear by God (and so bind oneself). This demonstrates negative convergence which expresses being together in an unusual, special or unwanted way, happening in the same special or unusual place or time, or unusually or passively approaching each other. Examples are the use of "x" in "juxtapose" and the Arabic "laadha" (=approch for protection), "idhn" (=permission), and "akh" (=brother). Note also the (b) NEGATIVE DIVERGENCE: The Arabic "h" in "hawaa" (=fall) and "kh" in "khalaa" (=past and gone) as well as the English "h" in "hate" express going apart in a very negative way, whereas the "h" in "high" is barely "negative" in conventional terms; rather it expresses having a distance from others in a special way. The English use of the "ex" in "except" is another application, along with the "te" in "tear."

(c) NEGATIVE DUALITY: In Arabic the prefix "t" as in "tafaaɸhala" is an example as one obvious application of negative duality (being subject to an exchange). In English, the third person "h" is just "none of the two." Examples are the use of the "h" in "he," "she," "they," and "them." General duality as in "harmonize" is also a common application together with its generalization to a multitude. Other examples are the Arabic "−aat" (feminine plural) and "−ah" (irregular plural).

(d) NEGATIVE FACULTY: This means belonging to a semantic theme in a special way or the absence (negation) of a faculty expressed by that semantic theme. The Arabic prefix for attention (haa-) and the infix "t" as in "iftaQHala," "−ah" and "−t" (suffixes for the feminine), "−dhaa" (=this, that), the "ZH" in "ZHill" (=shadow), and "khawaa" (=to be empty) are good examples. The English suffix "-ty" denotes the fact of being something special, an "enti-ty," a "faculty," etc. At the end of many words, "t" denotes the fact of being something special, an entity for itself as in "exit," "at," "it" and "lot." At the beginning of "take," "t" expresses breaking the ties (relations) expressed by that theme but also establishing a new forceful (unwanted) relation. The "t" in "true" expresses negative faculty.

Homeward Orientations: (+1 −2)

While the common and non-common orientations can be called "pure" in terms of having one type of sign for internal parts, the next two groups of orientations are "mixed" in that internal parts have opposite signs. Homeward letters occupy the first orientation column of matrix 200.

(a) SUBJECTIVITY: Focusing positively on its first part while ignoring the rest, such as the Arabic usage of "a" in "ana" (=I), "akmala" (=make complete, "a" as an assignment prefix), and "m" in "maa" (=what), "umm" (=mother, origin) and "man" (=who). In the English, "m" in "me," "a" in "auto-," and "s" in "self," and the "k" in "look" and "like" (a subjective mapping). The like "s" in "so?". The "a" in "ah!" and the "r" in "that's right!" are additional examples. The AA in column 1 of matrix 200 represents the use of "a" as in the Arabic "aleph" and not as a vowel.

(b) ANTI-OBJECTIVITY: Closely related to subjectivity and means focusing on negating the second part (object) of an orientation while ignoring the first part, such as the Arabic "a" in "aQHgama" (=remove lack of clarity from, "a−" as a negation prefix, "alif izaalah"). Similarly in the English "a" in "atypical", or the "k" in "kill." A combination of (a) and (b) is often the case such as the interrogative "a," "am" and "aw" in Arabic. One aspect of this orientation type is subjecting a certain object (−2) to something, like "a" in "assign." Another interpretation of "assigning" "A −" and "a −," as well as both instrumental and passive "m −." General negation (while ignoring objectivity) is a frequent application of this orientation type, such as the Arabic "m" in "maa" (=not) and the English "s" in (c) RECURSION: Means going back to the first part which could imply repeating something, such as "raAaa" (=see, think about), "QHaada" (=return or repeat), and "m" in "amlaa" (=dictate, delay). It is also seen in the English prefix "re-." This can be regarded as a dynamic aspect of (a), but is rather broader. The "k" in "keep" is an example. This orientation is also reflected in the use of the letter "m" in "mimic," and the "a" in "anew."

(d) SUBJECTIVE FACULTY: Means using the subjective aspect as if it would be the whole thing. This is expressed in the "m-" prefixes and in the Arabic "ka" (=like, as), "s" in "saara" (=walk, general stream), and the "HH" in "HHayaah" (=life). English examples include the "m" in "mass," "matter" and "time." Note also the usage of the suffixes "-ium," "-um," and "em." The contrast to (a) becomes clear through examples such as the use of the "a" in "all" expressing "all that there is." The use of the letter "s" in the term "stuff" as well as the "k" in "king" (the subjector) exhibit this orientation.

Outward Orientations: (−1 +2)

This group of orientation types, included in orientation column 2 of matrix 200 is symmetrical to the preceding group.

(a) OBJECTIVITY: of an orientation means focusing positively on its second part while ignoring the first, such as the conjunction "fa" (=then) and "li" (=to, for), also "yaa" (=calling: 0..). In English, the "y" in "you" and the "p" in "per" are good examples. The same concept is used to objectively assert or stress something like "y" in "yea," and the "j" in "just." In Arabic, this sense can be noted in the suffix "-n" in its different forms (nun altawkiid, tanween, etc.).

(b) ANTI-SUBJECTIVITY: is closely related to objectivity and means focusing on negating the first part (subject) of a orientation while ignoring the second part, such as Arabic "l" in "la" (=no), "DK" in "DKalla" (=go astray), the "sh" in "sharr" (=evil) and "shiyah" (=fault in appearance), the "z" in "zaala" (=vanish), and the "n" in "wanaa" (=fail). In English, note the use of the "l" in "low" and the "f" in "fail." A combination of (a) and (b) is often the case. One aspect of this orientation type is subjecting a certain subject (−1) to something, like the Arabic "n" in the prefix "infaQHla," "naAaa" (=become far) and in the English word "enable." General negation (while ignoring subjectivity) is a frequent application of this orientation type, such as (Arabic) negating "in" and the English letter "n" in "none," "un-," "no," etc.

(c) PROCURSION: Means going forward to the second part, such as in the Arabic "fii" (=in), and "lan" (=will not). In the English, note the use of the "p" in the "pro-" part of "-cursion," and in the English word "pour." Other examples include the "n" in "native," "nation," "near" and "next" as well as in "in." This can be regarded as a dynamic aspect of (a) but is rather more broad. As a counterpart to recursion, it can also mean negative repetition, such as the letter "l" denotes in the word "less" and in the Arabic word "laduud" (insisting enemy).

(d) OBJECTIVE FACULTY: Means using the objective aspect as if it would be the whole thing, such as the use of the suffix "=n" in Arabic and elsewhere to quantify or qualify something as in Arabic "-aan," and the English "-tion," "-nd," and "nt." Note also the letter "f" in "full." The use of the "n" in the idiom "nitty-gritty," "p" in "proof" and "prayer" as well as the "f" in "faith" and "false" are also good examples. Mixing up "v" and orientation. The letter "f" is used like the letter "d" which is closely related to the letter "v" of the same orientation column of matrix 200. The contrast to (a) becomes clear by looking at examples such as "n" in "number" expressing general quantification.

Categories/Semantic Themes: There are countless combinations of semantic themes in the words of different languages. Most words are meaningful and thus denote the nature of things and events to be known about and experimented with. The things words denote and the relations they describe are part of a consistent system. These are categorized by the rows of matrix 200.

Regarding the composition of semantic themes, there are three basic components to the knowledge of a thing as represented by letters:

(a) EXISTENCE, as expressed by the first row of matrix 200;

(b) HAPPENING, or forming as expressed by the second row; and (c) CONTROL or quantum, as expressed by the third row;

The remaining four rows of matrix 200 are combinations of (a), (b) and (c) and will be discussed after a short introduction into the first three.

Existence means not only "being there," but because of duality (having two sides) and its generalization to multitude, existence means being a part of a whole, having particles or being an element or point in time and space. Words like the article "a" as it refers to "one" thing, "u" in "unit," but also "a" in "all" and "w" in "we" demonstrate this property.

In Arabic, the letter "w" is used as a suffix to express multitude of nouns and verbs, but also as a conjunction (=and). The vocal "u" (dammah) is used for the nominative in nouns and the present in verbs, both denoting the positive faculty of being. Arabic "a" (hamza) is used to (subjectively) assert and assign much like the English "a."

Happening, taking place or forming means happening in space or time, becoming manifest, being a range of space or time or being "substance" that occupies space or time. This theme is also called "medium," "act (or)" and "arena." The different Arabic prefixes "m" and "fii" (=in) mentioned above, relate to this. "MaaA" (=water), "madd" (=stretch), "dam" (=blood), "daama" (=to last), "dhawaa" (=fade), "idh" (=when), and "idhaa" (if, when) are also good examples. Letter-semantically, both "matter" and "time" have to do with a special relation "t" to a subjectively perceived range of space or time "m." Looking also at the "m" in "move," "make," and "may," all deal with "happening" in space or time both intransitively (passively) and transitively (by action). An "action" is literally a self-assignment "a" to a common stream "c." Working by forces of nature leads to quantifying.

A quantum is both a force and a quantity. The laws of nature are often set equal to forces. While measuring forces we are dealing with quantities, which is a main way of conceiving the forces and laws of nature. "Q" in the stem "qdr" denotes energy, power, mightiness, capability, quantity, measure and destiny altogether. "QH" in "waQHy" denotes consciousness and good perception. The "n" in "wanaa" means weakness and failure to keep someth-ing up. The "NG" in "NGawaa" (=go astray) is used for "outlaw" issues and "NGayb" is the unknown. The English language has only two letters in this semantic theme, the common "q" and the objective "n," both found in words expressing "q-uantum," "q-uality," "q-uote," and the "n" in "n-umbers" and "n-ature." Anti-subjective quantifying ("n") is a prevailing means of negation in many Indo-European languages.

A "name" is an objective quantum for a subject, and "knowledge" is the mapping of objective quanta. A quantum is both a quantity and a force. It is both law and energy. It is used to move things, put them together and drive them apart, to define their distance and their dimensions.

The semantic "Theme of Assignments" is a combination of existence and taking place, i.e., particles and entities as they relate to things taking space or time. Two of the letters of the theme of row 4 are "r" and "l," the most frequent relators. If a stem has three consonants, it is probable that one of them is "r" denoting a recursive (backward) relation or "l" signifying a procursive relation between the other two letters. Arabic examples include "QHarDK" (=breadth, show) and "kallama" (=talk to, wound). The Arabic "qaraA" (=read) relates back "r" to quanta "q," i.e., it gives the subject a quantum of perception. English examples include "model," "field" and "steer." The "b" often expresses either a normal connection, such as in "be-" and "bi-," or a connected set of particles, such as in "ball." The "t" on the other hand represents a dual negative relation as in a "tie."

Streams or structures are particles controlled by forces, a combination of existence and quantifying. The words "see," "zap," and "cube" exemplify the three letters of this theme. Because of the dynamic-static aspect, streams also signify surfaces and structures, the Arabic words "Cuurah" (=picture, shape) and "HCawaa" (settle) are also good examples.

Sound and light consist of particles moving in certain directions in a regular wave-like pattrn after excitation by application of forces. A word can also be considered to be a stream-like entity. Streams, represented by row 5, are a marriage of quanta and particles. Both quanta and streams are used to express concepts such as "call," "conceive," "see," etc., letters being considered to have a dual wave-like orientation. A call, for example, is an assigned stream according to letter-semantics.

A subjective stream such as "s" is used to "see," "say," "sew" and "saw" things. A sea is just a subjective stream. But in "some," the "s" stresses quantifying. Arabic "qwl" (to say) defines saying as the objective assignment "1" of a quantum "q" where the English "say" simply expresses an outward transition "y" of a subjective stream.

Fields, or mappings are laws or forces applied to quantify things that take space or time. They are the result of operations subjecting media to laws or forces. The term "mapping" is often used to express this type of subjecting. A "key" does not apply to particles, but rather to a whole range in space and time. "X" in "ex−" means negative divergence or negative faculty applied as a force or quantifier to something in time or space. Arabic examples include "DKawA" (light) and "TKuul" (length).

Combining all three basic themes results in a general theme that is a general name for things and events (process such as in "go," "get," "girl," "good" and "God" (the Almighty). The English language has only this letter in this theme. The Arabic "shayA" (=object, thing), "ZHulm" (=offense, unfairness), and "HHayaah" (=life) exemplify the other three letters of this theme.

Letter-semantic analysis also relies on two important concepts of micro-syntactic analysis which are the fundamental rules used in the letter-semantic evaluation of words.

(1) At least two consonants are needed to deliver a specific concept. One consonant words are too general, such as "way," "go," and "do."

(2) The letter sequence in a word is decisive in determining the meaning of a combination of letters ("top" and "pot" contain the same letters but present two different concepts)

Because letters, or the sounds they represent, have meanings, the letter-semantic matrix 200 may be applied to the words of all alphabetical languages, without the need for translation. Matrix 200 contains consonants of languages other than Enqlish (i.e., "QH," "DH" and others), thus query words and text words need not be in the same language. Matrix 200 is capable of supporting letter-semantic analyses of words in most languages that do not require ideogram representations of words. Also, because the concepts presented by words are contained within the letters of the words, letter-semantic analysis does not require a dictionary of meanings limited to selected words. All words containing letters of the alphabet, including non-English alphabets, are capable of analysis. Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of applicant's general inventive concept.

What is claimed is:

1. A text comprehension and retrieval method for identifying text words presenting concepts in a computer coded document related to the concepts presented in a computer coded expression of query words, comprising the steps of:
    calculating a first letter-semantic value for each of the query words by comparing each of the query words to itself;
    calculating a plurality of second letter-semantic values for each of the text words in a plurality of blocks of text of dynamically predetermined size by comparing each of the query words to each of the text words in each of said blocks; identifying the text words of the one of said blocks having second letter-semantic values that compare most closely to said first letter-semantic values.

2. The method of claim 1 wherein said step of calculating a first letter-semantic value and said step of calculating a plurality of second letter-semantic values includes assigning a numeric value to the relationship of the letters of a first word to the letters of a second word according to a predetermined relationship matrix.

3. The method of claim 2 wherein said step of assigning a numeric value includes reducing said first word to a first stem of more than one and less than four consonants and reducing said second word to a second stem of more than one and less than four consonants, wherein the digraphs TH, GN, NG, NC, NK, CK, CH, GH, CQ, PH, and SH are treated as a single consonant.

4. The method of claim 3 wherein said step of assigning a numeric value includes assigning an orientation number, assigning orientation weight, assigning a category number and assigning a category weight to each consonant of said first and second stems, based on the following letter semantic matrix:

| CATE-GORY | WEIGHT | ORIENTATION | | | |
|---|---|---|---|---|---|
| | | 1 | 2 | 3 | 4 |
| 1 | 1 | AA | J | V, W | H |
| 2 | 1 | M | F, PH, P$_2$ | D | DH, TH |
| 3 | 1 | QH | N, GN | Q, CQ | NG, NK, NC |
| 4 | 2 | R | L | B | T |
| 5 | 2 | S | Z | C | HC |
| 6 | 2 | K, CK | DK | TK | X, KH, GH, CH |
| 7 | 3 | HH | SH | G | ZH | and where the category weight of the letter P is 2.

5. The method of claim 4 wherein said step of assigning an orientation number includes locating each consonant of each of said stems in a column of said matrix and assigning to said each consonant the orientation number at the top of said column, said step of assigning an orientation weight includes assigning the value of 0.5 to said each consonant, said step of assigning a category number includes locating said each consonant in a row of said matrix and assigning to said each consonant the category number of said row, and said step of assigning a category weight includes assigning to said each consonant the category weight number of said row.

6. The method of claim 5 wherein said step of assigning a numeric value includes comparing the orientation numbers of each pair of adjacent consonants of said first stem to the orientation numbers of each pair of adjacent consonants of said second stem and increasing an orientational association number by the sum of the orientation weights of the pair of adjacent consonants of said first stem when said orientation numbers of each pair match.

7. The method of claim 5 wherein said step of assigning a numeric value includes comparing the category numbers of each pair of adjacent consonants of said first stem to the category numbers of each pair of adjacent consonants of said second stem and increasing a category association number by the sum of the category weights of the pair of adjacent consonants of said first stem having the same category numbers as the pair of adjacent consonants of said second stem.

8. A text comprehension retrieval apparatus for identifying text words presenting concepts in a computer coded document related to the concepts presented in a computer coded expression of query words, comprising:
  means for calculating a first letter-semantic value for each of the query words by comparing each of the query words to itself;
  means for calculating a plurality of second letter-semantic values for each of the text words in a plurality of blocks of text of dynamically predetermined size by comparing each of the query words to each of the text words in each of said blocks;
  means for identifying the text words of the one of said blocks having second letter-semantic values that compare most closely to said first letter-semantic values.

9. The apparatus of claim 8 wherein said means for calculating a first letter-semantic value and said means for calculating a plurality of second letter-semantic values includes means for assigning a numeric value to the relationship of the letters of a first word to the letters of a second word according to a predetermined relationship matrix.

10. The apparatus of claim 9 wherein said step of assigning a numeric value includes reducing said first word to a first stem of more than one and less than four consonants and reducing said second word to a second stem of more than one and less than four consonants, wherein the digraphs TH, GN, NG, NC, NK, CK, CH, GH, CQ, PH, and SH are treated as a single consonant.

11. The apparatus of claim 10 wherein said means for assigning a numeric value includes assigning an orientation number, assigning an orientation weight, assigning a category number and assigning a category weight to each consonant of said first and second stems, based on the following letter semantic matrix:

| CATE-GORY | WEIGHT | ORIENTATION | | | |
|---|---|---|---|---|---|
| | | 1 | 2 | 3 | 4 |
| 1 | 1 | AA | J | V, W | H |
| 2 | 1 | M | F, PH, $P^2$ | D | DH, TH |
| 3 | 1 | QH | N, GN | Q, CQ | NG, NK, NC |
| 4 | 2 | R | L | B | T |
| 5 | 2 | S | Z | C | HC |
| 6 | 2 | K, CK | DK | TK | X, KH, GH, CH |
| 7 | 3 | HH | SH | G | ZH | and where the category weight of the letter P is 2.

12. The apparatus of claim 11 wherein said means for assigning an orientation number includes locating each consonant of each of said stems in a column of said matrix and assigning to said each consonant the orientation number at the top of said column, said means for assigning an orientation weight includes means for assigning the value of 0.5 to said each consonant, said means for assigning a category number includes means for locating said each consonant in a row of said matrix and assigning to said each consonant the category number of said row, and said means for assigning a category weight includes means for assigning to said each consonant the category weight number of said row.

13. The apparatus of claim 12 wherein said means for assigning a numeric value includes means for comparing the orientation numbers of each pair of adjacent consonants of said first stem to the orientation numbers of each pair of adjacent consonants of said second stem and means for increasing an orientational association number by the sum of the orientation weights of the pair of adjacent consonants of said first stem when said orientation numbers of each pair match.

14. The apparatus of claim 12 wherein said means for assigning a numeric value includes means for comparing the category numbers of each pair of adjacent consonants of said first stem to the category numbers of each pair of adjacent consonants of said second stem and means for increasing a category association number by the sum of the category weights of the pair of adjacent consonants of said first stem having the same category numbers as the pair of adjacent consonants of said second stem.

15. A method for determining a relation between a first word and a second word, comprising the steps of:
  storing an array of characters that represent selected alphabetical letters;
  assigning a predetermined first and second numeric position value and a predetermined first and second numeric weight value to each of said characters;
  converting selected letters of the first word and selected letters of the second word into first and second numeric position values and first and second numeric weight values corresponding to said first and second numeric position values and first and second numeric weight values assigned to those of said characters representing said selected letters;
  comparing the first and second numeric position values of said selected letters of the first word to the first and second numeric position values of said selected letters of the second word;
  accumulating the first and second numeric weight values of those of said selected letters of the first word having first and second numeric position values corresponding to the first and second numeric position values of said selected letters of the second word, respectively; and determining similarity between the first word and the second word in accordance with the accumulated first and second numeric weight values.

16. The method of claim 15 wherein said step of comparing includes comparing the first and second numeric position values of pairs of selected letters of the first word to the first and second numeric position values of corresponding pair of letters of the second word.

17. The method of claim 15 wherein said step of storing includes storing characters in a position of said array corresponding to a first and second meaning of the alphabetic letters represented by said character.

18. An apparatus for determining a relation between a first word and a second word, comprising:
- means for storing an array of characters that represent selected alphabetical letters;
- means for assigning a predetermined first and second numeric position value and a predetermined first and second numeric weight value to each of said characters;
- means for converting selected letters of the first word and selected letters of the second word into first and second numeric position values and first and second numeric weight values corresponding to said first and second numeric position values and first and second numeric weight values assigned to those of said characters representing said selected letters;
- means for comparing the first and second numeric position values of said selected letters of the first word to the first and second numeric position values of said selected letters of the second word;
- means for accumulating the first and second numeric weight values of those of said selected letters of the first word having first and second numeric position values corresponding to the first and second numeric position values of said selected letters of the second word, respectively; and
- means for determining similarity between the first word and the second word in accordance with the accumulated first and second numeric weight values.

19. The apparatus of claim 18 wherein said means for comparing includes means for comparing the first and second numeric position values of pairs of selected letters of the first word to the first and second numeric position values of corresponding pairs of letters of the second word.

20. The apparatus of claim 18 wherein said means for storing includes means for storing characters in a position of said array corresponding to a first and second meaning of the alphabetic letters represented by said character.

21. A method for determining sematic values of a word, comprising the steps of:
- storing an array of characters that represent selected alphabetical letters;
- assigning a predetermined first and second numeric positon value and a predetermined first and second numeric weight value to each of said characters;
- converting selected letters of the word into first and second numeric position values and first and second numeric weight values corresponding to said first and second numeric position values and first and second numeric weight values assigned to those of said characters representing said selected letters.

* * * * *

UNITED STATES PATENT AND TRADEMARK OFFICE
CERTIFICATE OF CORRECTION

PATENT NO. : 4,849,898

DATED : July 18, 1989

INVENTOR(S) : Tamman ADI

It is certified that error appears in the above-identified patent and that said Letters Patent is hereby corrected as shown below:

IN THE CLAIMS:

Claim 1, column 16, line 31, "identifying" should begin the next indented line.

Claim 4, column 16, line 60, change "$P_2$" to --$P^2$--.

Signed and Sealed this

Seventeenth Day of July, 1990

Attest:

HARRY F. MANBECK, JR.

Attesting Officer

Commissioner of Patents and Trademarks